US 10,889,284 B2

(12) United States Patent
Nishii

(10) Patent No.: US 10,889,284 B2
(45) Date of Patent: Jan. 12, 2021

(54) ELECTRIC VEHICLE AND CONTROL APPARATUS FOR THE SAME

(71) Applicant: HONDA MOTOR CO., LTD., Tokyo (JP)

(72) Inventor: Fumiya Nishii, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 87 days.

(21) Appl. No.: 16/278,284

(22) Filed: Feb. 18, 2019

(65) Prior Publication Data

US 2019/0256075 A1    Aug. 22, 2019

(30) Foreign Application Priority Data

Feb. 22, 2018   (JP) ................. 2018-029363

(51) Int. Cl.
| | |
|---|---|
| *B60K 6/26* | (2007.10) |
| *B60L 50/14* | (2019.01) |
| *B60W 10/08* | (2006.01) |
| *B60W 20/19* | (2016.01) |
| *H02P 27/06* | (2006.01) |

(52) U.S. Cl.
CPC .............. *B60W 10/08* (2013.01); *B60K 6/26* (2013.01); *B60L 50/14* (2019.02); *B60W 20/19* (2016.01); *H02P 27/06* (2013.01); *B60W 2710/081* (2013.01); *B60W 2710/083* (2013.01)

(58) Field of Classification Search
CPC ... B60L 50/14; B60W 10/11; B60W 2540/10; B60W 2540/16; B60W 2710/08–087
See application file for complete search history.

(56) References Cited

U.S. PATENT DOCUMENTS

| | | | | |
|---|---|---|---|---|
| 9,994,214 | B2* | 6/2018 | Kato ...................... | B60L 50/15 |
| 10,358,022 | B2* | 7/2019 | Masuda ............... | B60W 20/50 |
| 10,543,829 | B2* | 1/2020 | Kato ..................... | B60W 10/08 |
| 2007/0227792 | A1* | 10/2007 | Yonemori ............... | B60K 6/46 |
| | | | | 180/65.31 |

(Continued)

FOREIGN PATENT DOCUMENTS

| | | |
|---|---|---|
| JP | 2012-157200 A | 8/2012 |
| JP | 2017-118658 A | 6/2017 |

(Continued)

*Primary Examiner* — David R Morris
(74) *Attorney, Agent, or Firm* — Rankin, Hill & Clark LLP

(57) ABSTRACT

An electric vehicle allows a user to experience changes in acceleration g-force, as with a conventional power plant, including: a transmission that sets a gearshift position based on a gearshift position command value to be supplied, and reduces a rotation speed of a motor with the gear ratio based on the gearshift position to rotationally drive wheels; a user operation unit that outputs the gearshift position command value and a speed control amount, based on user operation; and a controller that sets a DC voltage command value or an AC voltage command value to an operation-based value corresponding to the gearshift position and the speed control amount, and, on the condition that operation on the user operation unit satisfies a predetermined condition, sets the DC voltage command value or the AC voltage command value to a value higher than the operation-based value for causing a change in acceleration.

4 Claims, 8 Drawing Sheets

(56) References Cited

U.S. PATENT DOCUMENTS

| | | | |
|---|---|---|---|
| 2016/0046278 A1* | 2/2016 | Matsuzaki | B60W 10/08 701/22 |
| 2017/0253233 A1 | 9/2017 | Masuda et al. | |
| 2017/0327107 A1* | 11/2017 | Ando | B60K 6/365 |
| 2017/0334426 A1 | 11/2017 | Kato et al. | |
| 2017/0334433 A1* | 11/2017 | Kato | B60W 20/11 |

FOREIGN PATENT DOCUMENTS

| | | |
|---|---|---|
| JP | 2017-206105 A | 11/2017 |
| WO | 2016084803 A1 | 6/2016 |

* cited by examiner

ELECTRIC VEHICLE AND CONTROL APPARATUS FOR THE SAME

CROSS-REFERENCE TO RELATED APPLICATION

This application claims the benefit of priority to Japanese Patent Application No. 2018-029363 filed 22 Feb. 2018, the disclosures of all of which are hereby incorporated by reference in their entireties.

TECHNICAL FIELD

The present invention relates to an electric vehicle and a control apparatus for the same.

BACKGROUND OF THE INVENTION

International Patent Application Publication No. 2016/084803 A1 describes a technique of improving acceleration of a vehicle having both an engine and a rotary electric machine, while keeping rotation of the engine stabilized.

SUMMARY OF THE INVENTION

Problems to be Solved

Incidentally, a vehicle equipped with a manual transmission and driven by a rotary electric machine is controlled so that, on the condition that a control amount of the accelerator pedal is constant, an output torque of the rotary electric machine is substantially constant regardless of a gear ratio. However, such a configuration only gives a small reaction from the vehicle when the user shifts gears. This makes some users feel unsatisfied because they can not experience a change in acceleration gravitational force (acceleration g-force) corresponding to the gearshift, which has been given by a conventional power plant (such as an internal combustion engine). The present invention has been made in view of the above circumstances, and is intended to provide an electric vehicle and a control apparatus for the same that allow the user to experience a change in acceleration g-force, as with a conventional power plant.

Solution to Problem

In order to solve the above problem, an electric vehicle according to the present invention includes: a motor; a wheel; a DC voltage generator that generates a DC voltage based on a DC voltage command value to be supplied; an inverter that converts the DC voltage into an AC voltage based on an AC voltage command value to be supplied, and applies the AC voltage to the motor; a transmission that sets a gearshift position based on a gearshift position command value to be supplied, and reduces a rotation speed of the motor with a gear ratio based on the gearshift position to rotationally drive the wheel; a user operation unit that outputs the gearshift position command value and a speed control amount, based on user operation; and a controller that sets the DC voltage command value or the AC voltage command value to an operation-based value corresponding to the gearshift position and the speed control amount, and, on the condition that operation on the user operation unit satisfies a predetermined condition, sets the DC voltage command value or the AC voltage command value to a value higher than the operation-based value for causing a change in acceleration.

Advantageous Effects of the Invention

The present invention allows a user to experience a change in an acceleration g-force, as with a conventional power plant.

EMBODIMENTS OF THE INVENTION

Configuration of Embodiment

Figure 1:
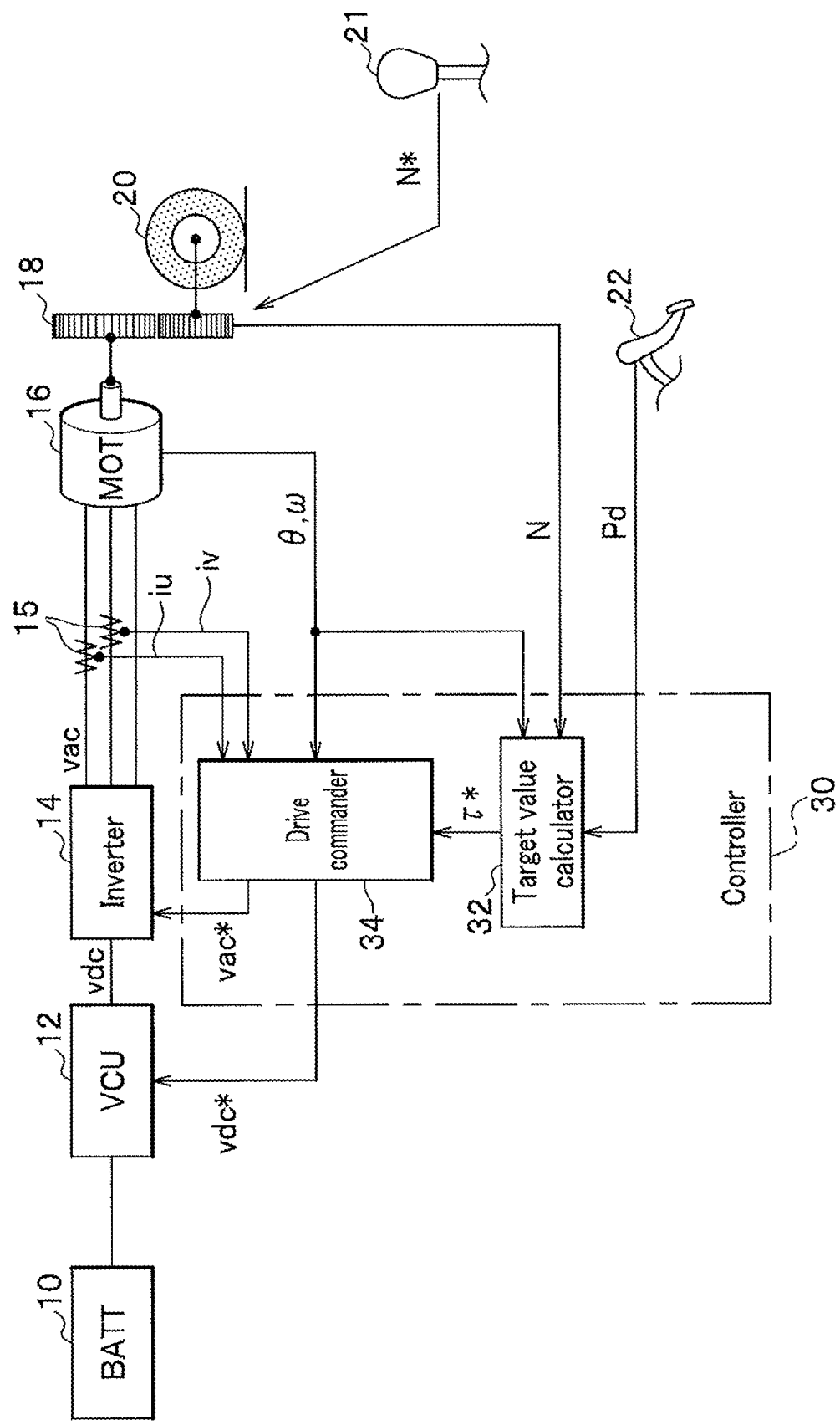
FIG. 1 is a is a block diagram of an electric vehicle according to an embodiment of the present invention.

FIG. 1 is a block diagram of an electric vehicle 1 according to an embodiment of the present invention. In FIG. 1, the electric vehicle 1 includes a battery 10, a voltage control unit (VCU, or DC voltage generator) 12, an inverter 14, a current sensor 15, a three-phase motor 16, a transmission 18, a wheel 20, a shift lever 21 (user operation unit), an accelerator pedal 22 (user operation unit), and a controller 30 (electric vehicle control apparatus).

The controller 30 includes hardware as a general computer, such as a CPU (Central Processing Unit), a RAM (Random Access Memory), and a ROM (Read Only Memory), wherein the ROM stores various control programs, data, and the like. The control program is loaded into the RAM and executed by the CPU. In FIG. 1, functions implemented by the control programs are shown in blocks inside the controller 30. That is, the controller 30 includes a target value calculator 32 and a drive commander 34.

The VCU 12 boosts the output voltage of the battery 10 and applies the boosted DC voltage vdc to the inverter 14. The inverter 14 executes PWM (Pulse Width Modulation) modulation on the DC voltage vdc to output three-phase AC voltage vac. The generated AC voltage vac is applied to each phase of the motor 16. The current sensor 15 measures currents of two phases (U-phase and V-phase in the drawing) of the three-phase currents supplied from the inverter 14 to the motor 16, and outputs the measurement results as current measurement values iu, iv. The rotating shaft of the motor 16 is coupled to the wheel 20 via the transmission 18. The motor 16 includes a rotation sensor (not shown), which outputs a rotation angle θ and a rotation speed ω of the motor 16.

The transmission 18 is set to one of gearshift positions. The shift lever 21 is operated by the user to output a gearshift position command value N* for commanding the transmission 18 to set the gearshift position. Once this gearshift position command value N* is supplied to the transmission 18, the gearshift position is switched in the transmission 18. Then, the transmission 18 outputs a gearshift position N which is currently set. Note that if the transmission 18 is a 5-speed transmission, for example, the gearshift position N and the gearshift position command value N* are set to a natural number between "1" to "5." The accelerator pedal 22 is pressed by the user to output a pedal depression amount Pd (speed control amount) representing a pressed depth.

In the controller 30, the target value calculator 32 calculates a torque command value τ* representing a torque to be generated by the motor 16, based on the rotation angle θ, the rotation speed ω, the gearshift position N, and the pedal depression amount Pd. Additionally, the drive commander 34 calculates a DC voltage command value vdc* for the DC voltage vdc and an AC voltage command value vac* for the AC voltage vac, based on the rotation angle θ, the rotation speed ω, the gearshift position N, the pedal depression amount Pd, and the current measurement values iu, iv. The DC voltage command value vdc* is supplied to the VCU 12, and the AC voltage command value vac* is supplied to the inverter 14.

Operation of Embodiment

<Case 1>

Figure 2:
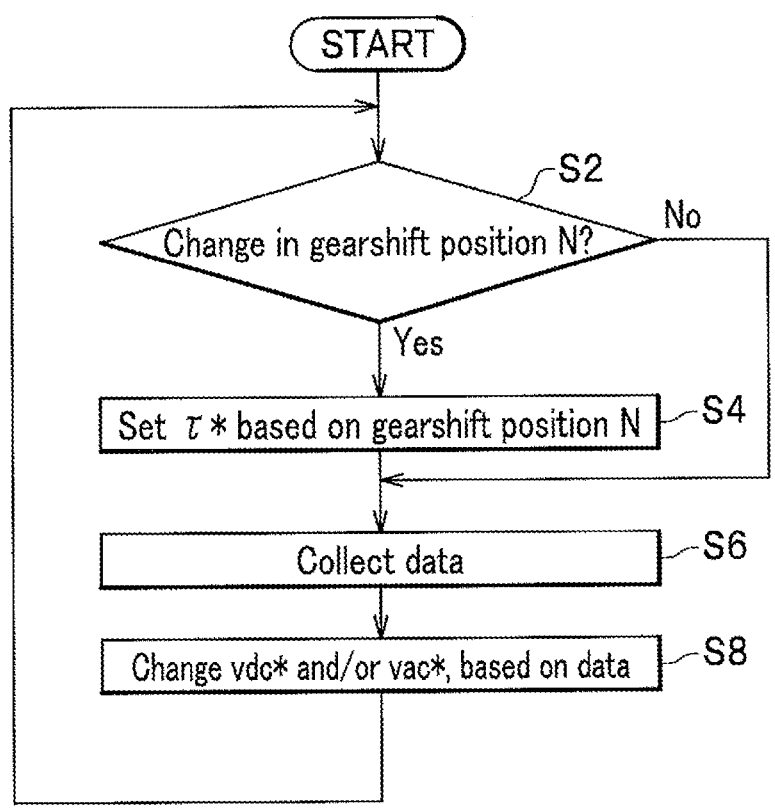
FIG. 2 is an exemplary flowchart of a control program executed in a controller.

FIG. 2 is an exemplary flowchart of a control program executed in the control unit 30. This control program is applied in a case where the pedal depression amount Pd is constant (e.g., the maximum value of the pedal depression amount Pd). In FIG. 2, when the processing proceeds to step S2, the target value calculator 32 determines whether or not a change has occurred in the gearshift position N. Here, if "Yes" is determined, the processing proceeds to step S4, where the target value calculator 32 sets the torque command value τ* for the drive commander 34, based on the gearshift position N.

Next, when the processing proceeds to step S6, the drive commander 34 collects data. That is, the drive commander 34 obtains current values of the current measurement values iu, iv, the rotation angle θ, and the rotation speed ω. Next, the processing proceeds to step S8, where the drive commander 34 changes, as required, the DC voltage command value vdc* and/or the AC voltage command value vac*, based on the obtained data, and then commands the VCU 12 and the inverter 14 with the results. Next, the processing returns to step S2 to repeat the foregoing processing in steps S2 through S8.

Figure 3:
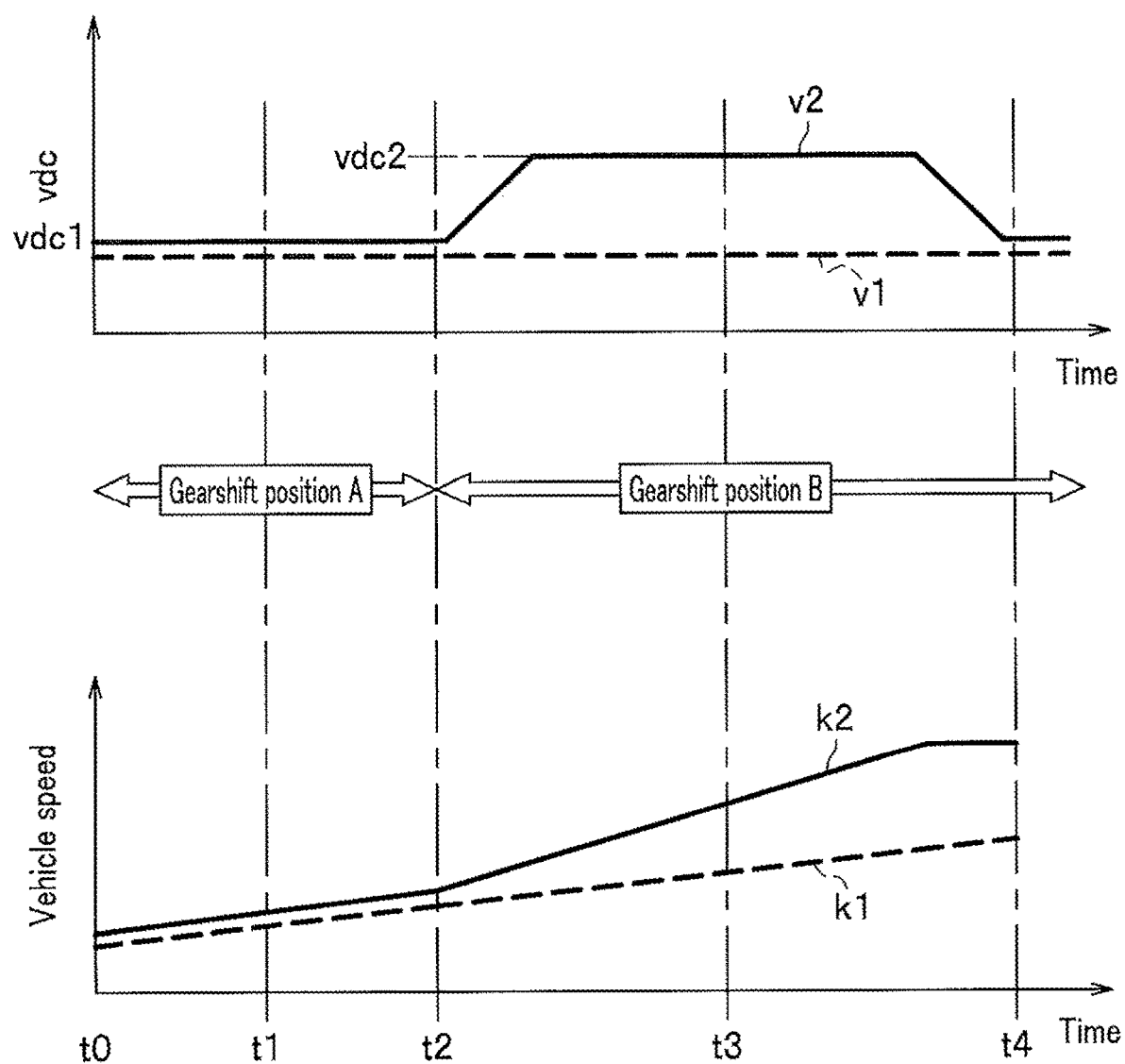
FIG. 3 is a chart showing an example of changes in vehicle speed and DC voltage.

FIG. 3 is a chart showing an example of changes in vehicle speed and DC voltage vdc in an operational case of the present embodiment (referred to as Case 1). In the example shown in FIG. 3, it is assumed that the pedal depression amount Pd (see FIG. 1) is constant (e.g., the maximum value of the pedal depression amount Pd) during a period from time t0 to time t4. It is also assumed that a gearshift position A is selected in the transmission 18 before time t2, and a gearshift position B is selected after time t2. Note that it is assumed that the gear ratio for the gearshift position B is smaller than that for the gearshift position A. A voltage v1 in the drawing is the DC voltage vdc in a comparative case. In this comparative case, the voltage v1 is always constant. Additionally, a vehicle speed k1 in the drawing is a vehicle speed in the comparative case and increases at a constant acceleration.

A voltage v2 in the drawing is the DC voltage vdc in Case 1 of the present embodiment. In this Case 1, after the gearshift position has been switched at time t2 from the gearshift position A to the gearshift position B, the voltage v2 is set to be higher than the voltage v1 for a predetermined period of time. Note that the voltage v1 is kept at the normal rated value vdc1 during the illustrated period of time. Here, the normal rated value vdc1 is a voltage that can be continuously set as the DC voltage vdc. In addition, the voltage v2 is kept at a temporary rated value vdc2 for some period of time (during a period from time t2 to time t4). Note that the temporary rated value vdc2 is a voltage that can be set as the DC voltage vdc on the condition that it lasts for a predetermined period of time (e.g., five minutes) or less. A vehicle speed k2 in the drawing is a vehicle speed in this Case 1. The vehicle speed k2 increases at a constant acceleration until time t2. However, the acceleration of the vehicle speed k2 increases after time t2, in accordance with the increase of the voltage v2. The change in acceleration of the vehicle speed k2 is implemented by changing the DC voltage command value vdc* or the AC voltage command value vac* in foregoing step S8 (see FIG. 2).

The AC voltage vac is not illustrated, but in both the comparative case and Case 1 of the present embodiment, if the pedal depression amount Pd has the maximum value, the AC voltage vac also has the maximum value. The maximum value of the AC voltage vac depends on the DC voltage vdc, and then the level of the AC voltage vac is proportional to the level of the DC voltage vdc (voltage v1 or v2) shown in FIG. 3. The DC voltage vdc (voltage v1 in FIG. 3) and the AC voltage vac in the comparative case depend on operation by the user, that is, the pedal depression amount Pd and the gearshift position N. Then, the DC voltage vdc and the AC voltage vac in the comparative case are referred to as "operation-based values." In contrast, the voltage v2 in Case 1 of the present embodiment is higher than the voltage v1 during the period from time t2 to time t4. Therefore, the voltage v2 during the said period is set to "a value higher than the operation-based value." Setting the voltage v2 during the said period to a value higher than the operation-based value is made in a case where the vehicle is upshifted during acceleration. When the vehicle is decelerated or downshifted, for example, the voltage v2 is preferably set to the operation-based value.

Figure 4:
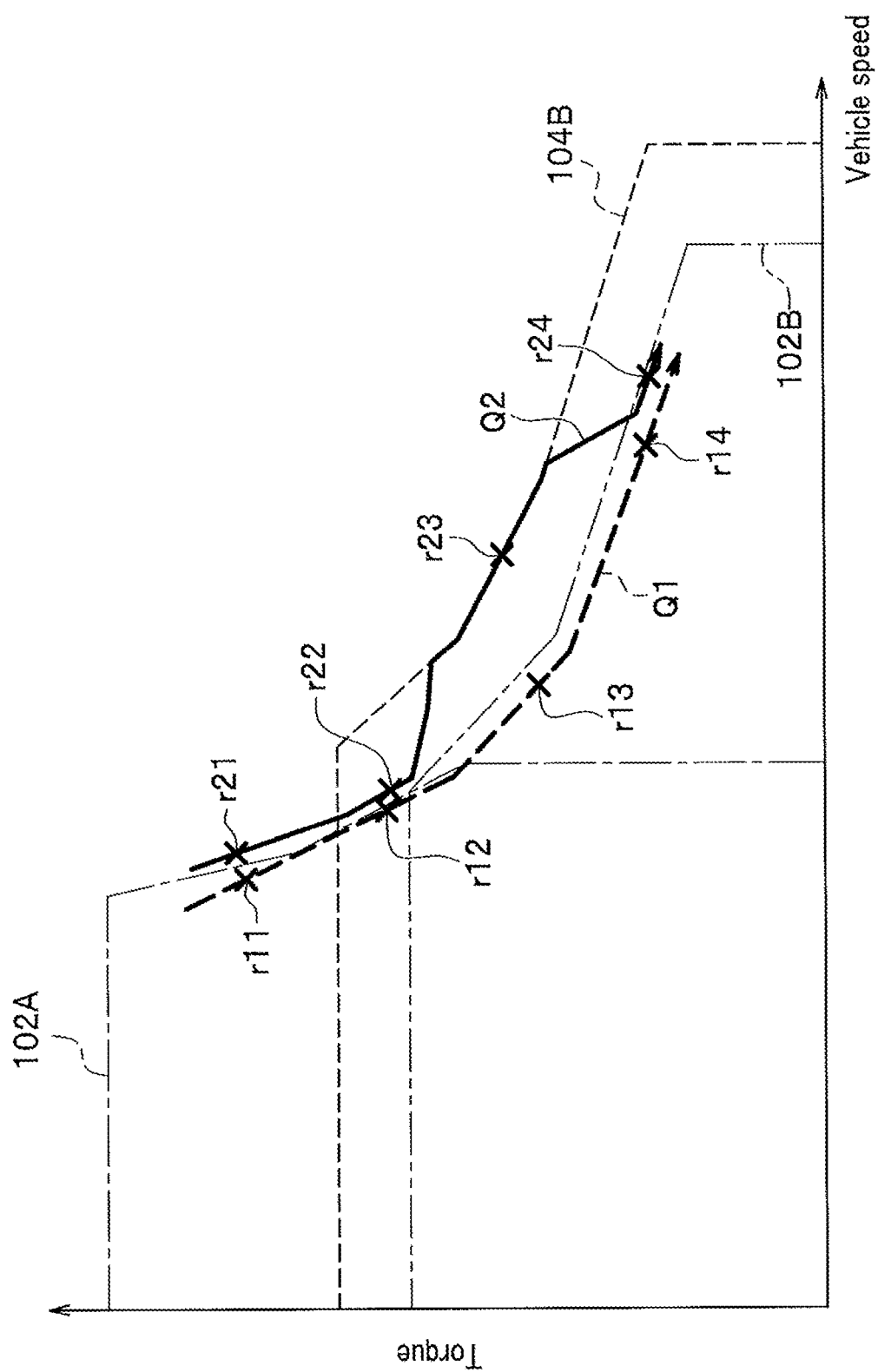
FIG. 4 is an example of a speed-torque curve.

FIG. 4 is an example of a speed-torque curve in Case 1 of the present embodiment. In FIG. 4, a range 102A enclosed by a chain line indicates a range where values of the vehicle speed and the torque of the motor 16 can fall therein when the DC voltage vdc is set to the normal rated value vdc1 and the gearshift position is set to the gearshift position A. In addition, a range 102б enclosed by a two-dot chain line indicates a range where values of the vehicle speed and the torque can fall therein when the DC voltage vdc is set to the normal rated value vdc1 and the gearshift position is set to the gearshift position B. Further, a range 104B enclosed by a dash line indicates a range where values of the vehicle speed and the torque can fall therein when the DC voltage vdc is set to the temporary rated value vdc2 and the gearshift position is set to the gearshift position B.

A characteristic curve Q1 is a driving characteristic curve in the comparative case, and points r11, r12, r13, r14 on the characteristic curve Q1 are operative points at times t1, t2, t3, t4 in FIG. 3, respectively, in the comparative case (i.e., at the vehicle speed k1). Likewise, a characteristic curve Q2 is a driving characteristic curve in the present embodiment, and points r21, r22, r23, r24 on the characteristic curve Q2 are operative points at times t1, t2, t3, t4 in FIG. 3, respectively, in the present embodiment (i.e., at the vehicle speed k2).

<Case 2>

Figure 5:
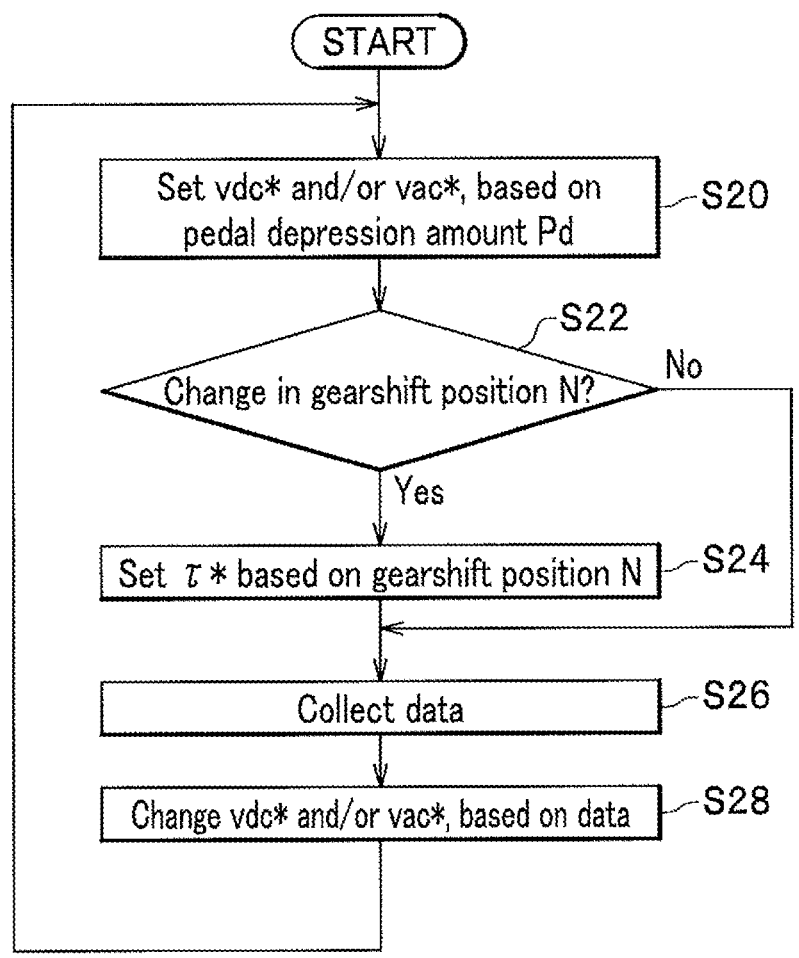
FIG. 5 is another exemplary flowchart of a control program executed in the controller.

FIG. 5 is another exemplary flowchart of the control program executed by the controller 30. This control program is applied in a case where the pedal depression amount Pd is varied by depression operation of the user. In FIG. 5, when the processing proceeds to step S20, the controller 30 sets the DC voltage command value vdc* and/or the AC voltage command value vac*, based on the current pedal depression amount Pd. More specifically, the target value calculator 32 first sets the torque command value τ* depending on the current pedal depression amount Pd.

That is, the torque command value τ* is set to have a larger value as the pedal depression amount Pd increases. Next, the drive commander 34 sets the AC voltage instruction value vac* so as to have a larger value as the torque command value τ* increases. Here, when the AC voltage command value vac* increases, there is a case where the current DC voltage vdc is not enough to implement the corresponding AC voltage vac. In such a case, the drive commander 34 also increases the DC voltage command value vdc*, as required.

Next, the processing in steps S22 to S28 is executed. This processing is similar to that in steps S2 to S8 in "Case 1" as described above. That is, in step S22, the target value calculator 32 determines whether or not a change has occurred in the gearshift position N. Here, if "Yes" is determined, the target value calculator 32 sets in step S24 the torque command value τ* for the drive commander 34 based on the gearshift position N. In step S26, the drive commander 34 collects data. In step S28, the drive commander 34 changes, as required, the DC voltage command value vdc* and/or the AC voltage command value vac*, based on the obtained date, and then commands the VCU 12 and the inverter 14 with the results. Also in Case 2, the foregoing processing in steps S22 to S28 is repeated.

Figure 6:
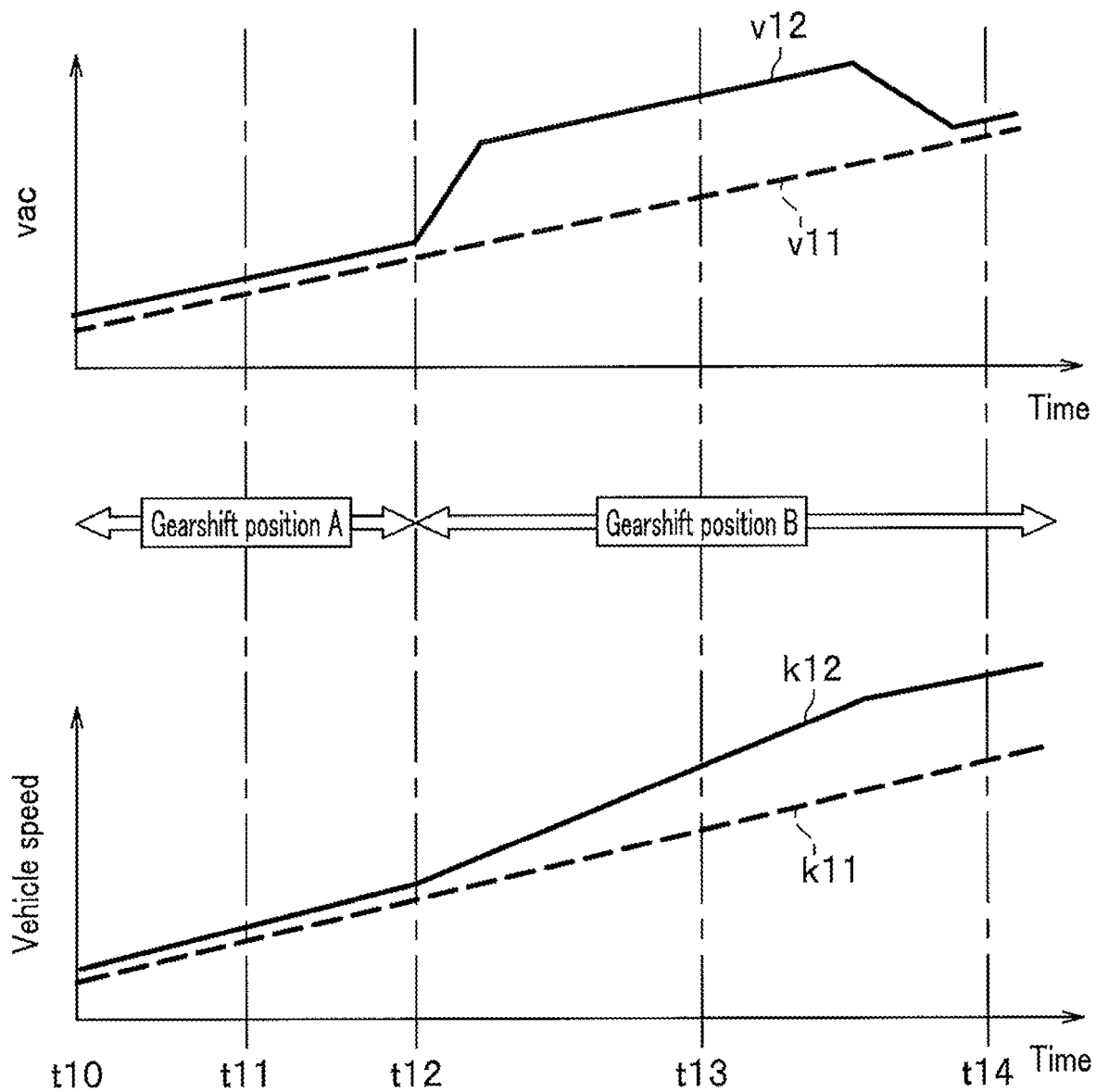
FIG. 6 is a chart showing an example of changes in vehicle speed and AC voltage.

FIG. 6 is a chart showing an example of changes in vehicle speed and AC voltage vac in Case 2. In the example shown in FIG. 6, it is assumed that the pedal depression amount Pd increases in a shape of a ramp function graph (not shown) during a period from time t10 to time t14. It is also assumed that the gearshift position A is selected in the transmission 18 until time t12, and the gearshift position B is selected after time t12. Note that it is assumed, as in the example shown in FIG. 3, that the gear ratio for the gearshift position B is smaller than that for the gearshift position A. A voltage v11 in the drawing is the AC voltage vac in the comparative case. In this comparative case, the voltage v11 increases in a shape of a ramp function graph in proportion to the pedal depression amount Pd. Additionally, a vehicle speed k11 in the drawing is a vehicle speed in the comparative case.

A voltage v12 in the drawing is the AC voltage vac in the present embodiment. In the present embodiment, after the gearshift position has been switched at time t12 from the gearshift position A to the gearshift position B, the voltage v12 is set to be higher than the voltage v11 for a predetermined period of time. A vehicle speed k12 in the drawing is a vehicle speed in the present embodiment. The vehicle speed k12 increases until time t12, as with the vehicle speed k11. However, the acceleration of the vehicle speed k12 increases after time t12, in accordance with the increase of the voltage v12.

Figure 7:
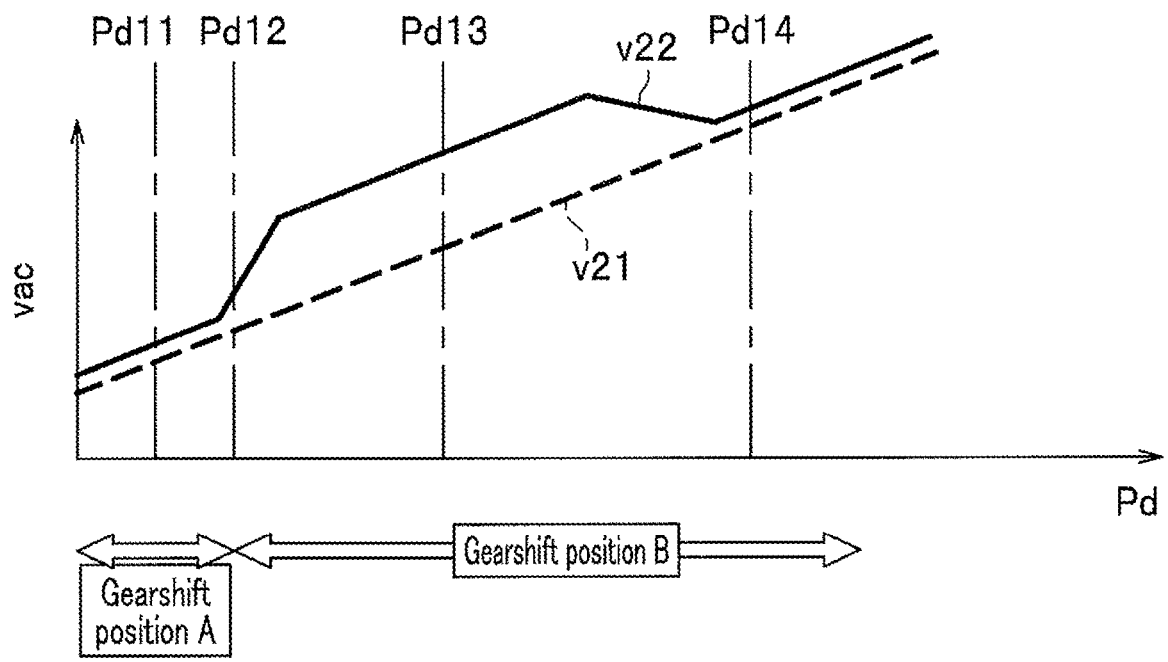
FIG. 7 is a chart showing an example of changes in AC voltage with respect to a pedal depression amount.

FIG. 7 is a chart showing an example of changes in AC voltage vac with respect to the pedal depression amount Pd in Case 2. That is, FIG. 7 is the same as FIG. 6 on the point that both shows changes in AC voltage vac, but is different from FIG. 6 on the point that the horizontal axis represents the pedal depression amount Pd. The pedal depression amounts Pd11 to Pd14 in the drawing are the pedal depression amount Pd at times t11 to t14 in FIG. 6, respectively. Voltages v21, v22 in FIG. 7 correspond to the voltages v11, v12 in FIG. 6, respectively.

Figure 8:
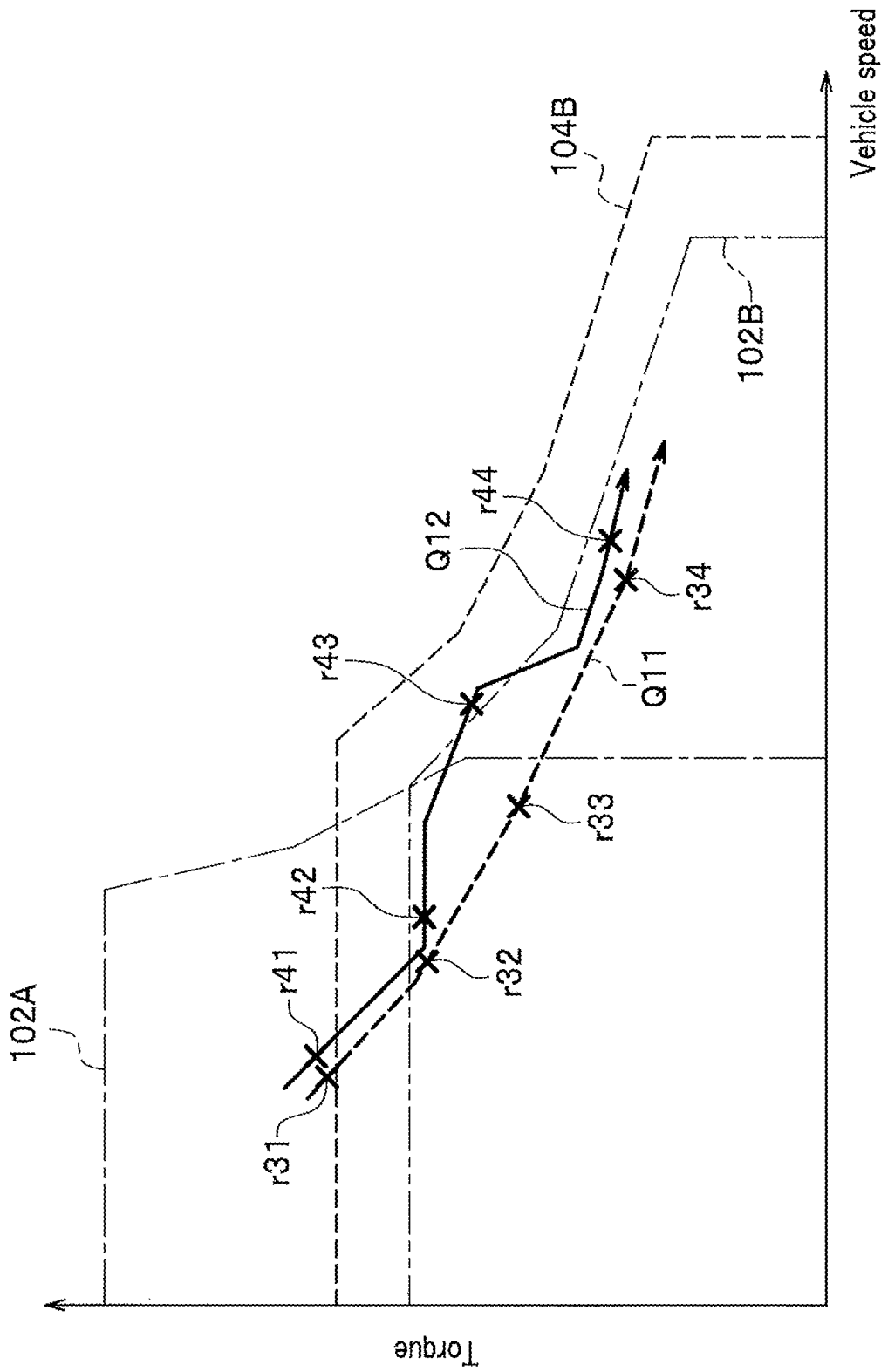
FIG. 8 is another example of a speed-torque curve.

FIG. 8 is a speed-torque curve in Case 2 of the present embodiment. In FIG. 8, the definitions of the ranges 102A, 102B, 104B are the same as those in FIG. 4. In addition, a characteristic curve Q11 is a driving characteristic curve in the comparative case, and points r31, r32, r33, r34 on the characteristic curve Q11 correspond to operative points at times t11, t12, t13, t14 in FIG. 6, respectively, in the comparative case (i.e., at the vehicle speed k11). Likewise, a characteristic curve Q12 is a driving characteristic curve in Case 2 of the present embodiment, and points r41, r42, r43, r44 on the characteristic curve Q12 are operative points at times t11, t12, t13, t14 in FIG. 6, respectively, in Case 2 (i.e., at the vehicle speed k12). In this Case 2, the DC voltage vdc is kept at the normal rated value vdc1 (see FIG. 3) for most of the period. However, the characteristic curve Q12 is out of the range 1026, which is implementable with the normal rated value vdc1, around the operative point r43 in FIG. 8. Accordingly, the DC voltage vdc is set to a value slightly higher than the normal rated value vdc1, during a period of the characteristic curve Q12 being out of the range 102B.

Advantageous Effects of Embodiment

As described above, the electric vehicle 1 of the present embodiment includes: the transmission 18 that sets the gearshift position N based on the gearshift position command value N* to be supplied, and reduces the rotation speed of the motor 16 with the gear ratio based on the gearshift position N to rotationally drive the wheels 20; the user operation units 21, 22 that output the gearshift position command value N* and the speed control amount Pd, based on user operation; and the controller 30 that sets the DC voltage command value vdc* or the AC voltage command value vac* to the operation-based value v1/v11 corresponding to the gearshift position N and the speed control amount Pd, and, on the condition that operation on the user operation units 21, 22 satisfies a predetermined condition, sets the DC voltage command value vdc* or the AC voltage command value vac* to a value higher than the operation-based value v1/v11 for causing a change in acceleration. This allows the user to experience changes in acceleration g-force due to the torque increase, as with a conventional power plant (such as an internal combustion engine).

In addition, according to the present embodiment, the predetermined condition is that the gearshift position N is changed and a predetermined time elapses after the change. This allows for presenting an increase in acceleration at the time of gearshift operation, as with a conventional power plant.

Modifications

The present invention is not limited to the foregoing embodiment, and various modifications are possible. The foregoing embodiment is described for the purpose of illustrating the present invention, and the present invention is not necessarily limited to the embodiment having all the components as described above. Alternatively, other configuration may be added to the configuration of the foregoing embodiment, and/or a part of the configuration may be replaced with other configuration. In addition, control lines and information lines shown in the drawings are those considered necessary for the purpose of illustration, and all control lines and information lines required for implementing the product are not necessarily shown. In practice, it is safe to say that almost all the components are mutually connected. Possible modifications of the foregoing embodiment are as follows, for example.

1) Hardware of the controller 30 in the foregoing embodiment is implementable using a general computer, and then the programs and the like shown such as in FIGS. 2, 5 may be stored in a storage medium or distributed via a transmission channel.

2) In the forgoing embodiment, the processing shown such as in FIGS. 2, 5 has been described as software processing using one or more programs, but some or all of the processing may be replaced with hardware processing using an ASIC (Application Specific Integrated Circuit), an FPGA (Field-Programmable Gate Array), or the like.

What is claimed is:

1. An electric vehicle comprising:
   a motor;
   a wheel;
   a DC voltage generator configured to generate a DC voltage based on a DC voltage command value to be supplied;
   an inverter configured to convert the DC voltage into an AC voltage based on an AC voltage command value to be supplied, and apply the AC voltage to the motor;
   a transmission configured to set a gearshift position based on a gearshift position command value to be supplied, and reduce a rotation speed of the motor with a gear ratio based on the gearshift position to rotationally drive the wheel;
   a user operation unit configured to output the gearshift position command value and a speed control amount, based on user operation; and
   a controller configured to set each of the DC voltage command value and the AC voltage command value to an operation-based value corresponding to the gearshift position and the speed control amount, and, when operation on the user operation unit is upshifting during acceleration, set each of the DC voltage command value and the AC voltage command value to a value higher than the operation-based value for causing a change in acceleration, and set the DC voltage to a voltage higher than a normal rated voltage.

2. The electric vehicle as claimed in claim 1, wherein the controller is configured to keep setting each of the DC voltage command value and the AC voltage command value to the value higher than the operation-based value until a predetermined time elapses after the gearshift position has been changed.

3. A control apparatus for an electric vehicle including:
   a motor;
   a wheel;
   a DC voltage generator configured to generate a DC voltage based on a DC voltage command value to be supplied;
   an inverter configured to convert the DC voltage into an AC voltage based on an AC voltage command value to be supplied, and apply the AC voltage to the motor;
   a transmission configured to set a gearshift position based on a gearshift position command value to be supplied, and reduce a rotation speed of the motor with a gear ratio based on the gearshift position to rotationally drive the wheels; and
   a user operation unit configured to output the gearshift position command value and a speed control amount, based on user operation,
   the control apparatus being configured to set the DC voltage command value and the AC voltage command value to an operation-based value corresponding to the gearshift position and the speed control amount, and,
   when operation on the user operation unit is upshifting during acceleration, to set each of the DC voltage command value and the AC voltage command value to a value higher than the operation-based value for causing a change in acceleration, and to set the DC voltage to a voltage higher than a normal rated voltage.

4. The control apparatus as claimed in claim 3, wherein the DC voltage command value and the AC voltage command value are each kept to the value higher than the operation-based value until a predetermined time elapses after the gearshift position has been changed.

* * * * *